US005925177A

United States Patent [19]

[11] Patent Number: 5,925,177

[45] Date of Patent: Jul. 20, 1999

Carreira et al.

[54] YELLOW INK FOR INK JET PRINTING

[75] Inventors: Leonard M. Carreira, Penfield; Kathy-Jo Brodsky, Palmyra; Mary Anne Evans, Pittsford; Anne L. Wickett, Ontario; Christine C. Lyons; Louis V. Isganitis, both of Rochester, all of N.Y.

[73] Assignee: Xerox Corporation, Stamford, Conn.

[21] Appl. No.: 09/070,901

[22] Filed: May 1, 1998

Related U.S. Application Data

[51] Int. Cl.$^{6}$ .................................................... C09D 11/02

[52] U.S. Cl. .................. 106/31.43; 106/31.5; 106/31.58

[58] Field of Search ............................... 106/31.43, 31.5, 106/31.58

[56] References Cited

U.S. PATENT DOCUMENTS

| | | | |
|---|---|---|---|
| 4,840,674 | 6/1989 | Schwarz | 106/31.43 |
| 5,006,170 | 4/1991 | Schwarz et al. | 106/31.43 |
| 5,017,224 | 5/1991 | Tomita et al. | 106/31.43 |
| 5,122,187 | 6/1992 | Schwarz et al. | 106/31.43 |
| 5,156,675 | 10/1992 | Breton et al. | 106/31.43 |
| 5,476,541 | 12/1995 | Tochihara | 106/31.58 |
| 5,766,325 | 6/1998 | Gundlach et al. | 106/31.43 |
| 5,769,930 | 6/1998 | Sano et al. | 106/31.58 |
| 5,810,916 | 9/1998 | Gundlach et al. | 106/31.49 |

*Primary Examiner*—Helene Klemanski
*Attorney, Agent, or Firm*—Judith L. Byorick

[57] ABSTRACT

Disclosed is an ink composition which comprises (a) water; (b) Acid Yellow 23 dye; and (c) urea.

22 Claims, No Drawings

YELLOW INK FOR INK JET PRINTING

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises (a) water; (b) Acid Yellow 23 dye; and (c) urea.

Ink jet printing systems generally are of two types: continuous stream and drop-on-demand. In continuous stream ink jet systems, ink is emitted in a continuous stream under pressure through at least one orifice or noble. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 4,840,674 (Schwarz), the disclosure of which is totally incorporated herein by reference, discloses an improved ink composition which comprises a major amount of water; an organic solvent selected from the group consisting of tetramethylene sulfone; 1,1,3,3-tetramethyl urea; 3-methyl sulfolane; and 1,3-dimethyl-2-imidazolidone; which solvent has permanently dissolve dissolved therein spirit soluble dyes such as black, yellow, cyan, magenta, brown, and mixtures thereof.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamindes; phosphites; phosphonates; phosphates; alkyl sulfines; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

Acid Yellow 23 dye has several color advantages over other yellow dyes used in ink compositions. Acid Yellow 23 dye also, however, can be difficult to dissolve in many common ink vehicles. Use of Acid Yellow 23 dye in ink vehicles commonly used for thermal ink jet printing can result in problems such as high particle counts in freshly made inks and increasing particle counts in the inks over time, which in turn can lead to clogging of jets in the printer or other particle-related failure modes as the inks age. In addition, inks containing Acid Yellow 23 dye can exhibit ink crusting on the printhead's front face and elsewhere upon drying or when heated. Acid Yellow 23 containing inks often have very low measured first drop latency, low recoverability, and low functional latency, and excessive orange crusting is often observed on the front face of the printhead. In addition, Acid Yellow 23 containing inks can exhibit instability after freeze/thaw cycling, with the dye precipitating from the ink after a single freeze/thaw cycle. These disadvantages of Acid Yellow 23 dye can sometimes be addressed by lowering the relative amount of the dye in the ink, but the resulting ink then may exhibit inferior color gamut and/or optical density.

Accordingly, while known compositions and processes are suitable for their intended purposes, a need remains for improved ink compositions suitable for use in ink jet printing processes. In addition, a need remains for ink compositions with desirable yellow color characteristics. Further, a need remains for ink compositions with desirable yellow color characteristics which exhibit reduced crusting when used in an ink jet printer. Additionally, a need remains for ink compositions with desirable yellow color characteristics which exhibit improved recoverability, improved maintainability, and improved functional latency when used in an ink jet printer. There is also a need for ink compositions with desirable yellow color characteristics which exhibit reduced particulates in the ink. In addition, there is a need for ink compositions with desirable yellow color characteristics which exhibit low intercolor bleed when printed next to inks of other colors. Further, there is a need for ink compositions with desirable yellow color characteristics which exhibit improved freeze/thaw stability. Additionally, there is a need for ink compositions containing Acid Yellow 23 dye wherein the dye is present in the ink in desirably high concentrations.

SUMMARY OF THE INVENTION

It is an object of the present invention to provide ink compositions with the above noted advantages.

It is another object of the present invention to provide improved ink compositions suitable for use in ink jet printing processes.

It is yet another object of the present invention to provide ink compositions with desirable yellow color characteristics.

It is still another object of the present invention to provide ink compositions with desirable yellow color characteristics which exhibit reduced crusting when used in an ink jet printer.

Another object of the present invention is to provide ink compositions with desirable yellow color characteristics which exhibit improved recoverability, improved maintainability, and improved functional latency when used in an ink jet printer.

Yet another object of the present invention is to provide ink compositions with desirable yellow color characteristics which exhibit reduced particulates in the ink.

Still another object of the present invention is to provide ink compositions with desirable yellow color characteristics which exhibit low intercolor bleed when printed next to inks of other colors.

It is another object of the present invention to provide ink compositions with desirable yellow color characteristics which exhibit improved freeze/thaw stability.

It is yet another object of the present invention to provide ink compositions containing Acid Yellow 23 dye wherein the dye is present in the ink in desirably high concentrations.

These and other objects of the present invention (or specific embodiments thereof) can be achieved by providing an ink composition which comprises (a) water; (b) Acid Yellow 23 dye; and (c) urea.

DETAILED DESCRIPTION OF THE INVENTION

Inks of the present invention contain an aqueous liquid vehicle, Acid Yellow 23 dye, and urea. The liquid vehicle can consist solely of water, or it can comprise a mixture of wafer and a water soluble or water miscible organic component, such as ethylene glycol, propylene glycol, diethylene glycols, glycerine, dipropylene glycols, polyethylene glycols, polypropylene glycols, amides, ethers, substituted ureas, ethers, carboxylic acids and their salts, esters, alcohols, organosulfides, organosulfoxides, sulfones, alcohol derivatives, carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 80 to about 99.9 percent by weight of the ink, and preferably from about 90 to about 98 percent by weight of the ink, although the amount can be outside of these ranges.

One example of a suitable organic component for the aqueous liquid vehicle is sulfolane. When present, the sulfolane is present in the ink in any effective or desired amount, typically from about 5 to about 30 percent by weight of the ink composition, and preferably from about 9 to about 25 percent by weight of the ink composition, although the amount can be outside of these ranges.

Another example of a suitable organic component for the aqueous liquid vehicle is tripropylene glycol monomethyl ether. When present, the tripropylene glycol monomethyl ether is present in the ink in any effective or desired amount, typically from about 5 to about 25 percent by weight of the ink composition, and preferably from about 14 to about 25 percent by weight of the ink composition, although the amount can be outside of these ranges.

Another example of a suitable organic component for the aqueous liquid vehicle is butyl carbitol (diethylene glycol monobutyl ether). When present, the butyl carbitol is present in the ink in any effective or desired amount, typically from about 2 to about 20 percent by weight of the ink composition, and preferably from about 3 to about 15 percent by weight of the ink composition, although the amount can be outside of these ranges.

Another example of a suitable organic component for the aqueous liquid vehicle is acetylethanolamine. When present, the acetylethanolamine is present in the ink in any effective or desired amount, typically from about 2 to about 25 percent by weight of the ink composition, and preferably from about 5 to about 20 percent by weight of the ink composition, although the amount can be outside of these ranges.

One specific example of a preferred aqueous vehicle is a mixture of water/sulfolane/tripropylene glycol monomethyl ether. In this embodiment, the sulfolane is present in the ink in an amount of from about 10 to about 30 percent by weight of the ink, and preferably from about 22 to about 28 percent by weight of the ink, and the tripropylene glycol monomethyl ether is present in the ink in an amount of from about 8 to about 25 percent by weight of the ink, and preferably from about 8 to about 10 percent by weight of the ink, although the relative amounts can be outside of these ranges. Another specific example of a preferred aqueous vehicle is a mixture of water/sulfolane/butyl carbitol/acetylethanolamine. In this embodiment, the sulfolane is present in the ink in an amount of from about 5 to about 30 percent by weight of the ink, and preferably from about 10 to about 20 percent by weight of the ink, the butyl carbitol is present in the ink in an amount of from about 3 to about 15 percent by weight of the ink, and preferably from about 6 to about 12 percent by weight of the ink, and the acetylethanolamine is present in the ink in an amount of from 2 to about 25 percent by weight of the ink, and preferably from about 15 to about 20 percent by weight of the ink, although the relative amounts can be outside of these ranges.

Inks of the present invention also contain Acid Yellow 23 Dye. Examples of commercially available dyes include Tartrazine Extra Conc. (FD&C Yellow #5, Acid Yellow 23, available from Sandoz), Duasyn® Acid Yellow XX-SF VP413 (Acid Yellow 23, available from Hoechst), PROJET YELLOW OAM (Acid Yellow 23, available from available from ICI and from Zeneca Colors, Wilmington, Del.), and the like. The dye is present in the ink in any effective or desired amount, typically from about 1 to about 8 percent by weight of the ink, and preferably from about 3 to about 6 percent by weight of the ink, although the amount can be outside of these ranges.

Inks of the present invention also contain urea. Urea is present in the ink in any effective or desired amount. In a preferred embodiment, the urea is present in an amount of from about 5 to about 15 percent by weight, and more preferably from about 5 to about 10 percent by weight, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

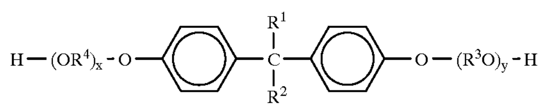

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 6 to about 9.25, and preferably from about 7 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nobles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Ink compositions of the present invention exhibit improved latency. Latency is a test which entails a measurement of drop transit time from a single jet after various idle times. The jet is fired 500 or 1,000 times to make sure it is operating properly, and is then left idle for a time. First drop latency is measured as the transit time of the first drop to be fired after the idle time. Ninth drop latency is the transit time of the ninth drop attempted to be fired after the idle time is monitored. In the testing protocol used for the inks below, to simulate "Worst case" conditions, the front face of the device is kept in an environment of dry air. The cycle of jetting drops, idle time, and then drop transit time measurement is repeated, usually using increasing idle times. The latency of the ink is the longest idle time before which the transit time exceeds a certain set criteria (usually 80 microseconds for 600 dpi, 100 microseconds for 300 dpi). The longer the transit time, the slower the drop velocity. The latency value depends on the intervals used for idle times. Often measurements are done only at broadly spaced, discrete intervals, i.e., 2, 5, 10, 20, 30, 50, 75, 100, 200, etc. seconds.

Inks of the present invention also exhibit improved functional latency. Functional latency is a test structured much like the latency test described above. Rather than monitoring the transit time of a single jet, however, the entire printhead prints a tone pattern after the period of idle time. By looking at the beginning of the tone pattern, one can count the number of drops that need to be jetted out of each nozzle before the tone pattern looks "perfect". The functional latency is the longest idle time for which the tone pattern appears "perfect" for the first drop ejected from each jet.

Inks of the present invention further exhibit improved recoverability. Recoverability is defined as an attempt to measure the ability of the printhead/ink combination to operate after long periods of inactivity, whether capped in the capping station, or, in a worst case scenario, with the printhead left out exposed to the ambient atmosphere. The time scale for this measurement is much longer than that for latency, and is measured in hours or even days. The measurement is also a function of the maintenance station and algorithms used to service the printhead. For instance, it is not expected that the printhead will run perfectly after being left out on a desk overnight. It is also expected, however, that the printhead cannot require a large number of primes to get all the jets in the printhead working properly. The measurement used for recoverability is usually a visual assessment of prints, most frequently of a pattern that lets one see if all of the jets are operating.

Additionally, inks of the present invention exhibit improved maintainability. Maintainability is a measurement that attempts to assess how the printhead/ink combination operates in a normal machine environment, again using the normal maintenance procedures designed into the particular machine. For instance, machines often send the printhead over to the side to "spit" a small number of drops periodically, even as the printer is printing a document, to "exercise" jets that may be idle for long periods because of the particular image being printed. In general, the measurement is usually done via a visual assessment of an analytical image pattern that enables one to see if and how all of the jets are firing. This measurement attempts to assess the practical effects of latency performance in a situation intended to simulate more realistically the machine operating conditions.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Comparative

An ink composition was prepared by simple mixing of the following ingredients:

| Ingredient | Supplier | Amount (wt. %) |
|---|---|---|
| PROJET YELLOW OAM dye (Acid Yellow 23)* | Zeneca Colors | 60 |
| sulfolane** | Phillips 66 | 21 |
| tripropylene glycol monomethyl ether (DOWANOL TPM) | Dow Chemical Co. | 18 |
| DOWICIL 150/200 biocide | Dow Chemical Co. | 0.1 |
| polyethylene oxide*** | Polysciences | 0.05 |
| tris(hydroxymethylamino) methane | American Biorganics | 0.5 |
| ethylene diamine tetraacetic acid | Dow Chemical Co. | 0.35 |

*solution containing 7.5% by weight dye solids in water
**95% by weight sulfolane, 5% by weight water
***bisphenol-A derivative, molecular weight 18,500, of the formula

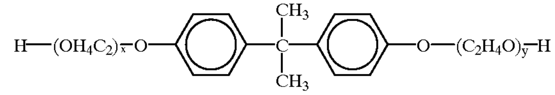

The resulting ink composition exhibited a viscosity of 3.43 centipoise at 25° C., a surface tension of 41.7 dynes per centimeter, and a pH of 7.63 at 25° C.

EXAMPLE II

An ink composition was prepared by simple mixing of the following ingredients:

| Ingredient | Supplier | Amount (wt. %) |
|---|---|---|
| PROJET YELLOW OAM dye (Acid Yellow 23)* | Zeneca Colors | 53.33 |
| sulfolane** | Phillips 66 | 21 |
| tripropylene glycol monomethyl ether (DOWANOL TPM) | Dow Chemical Co. | 18 |
| DOWICIL 150/200 biocide | Dow Chemical Co. | 0.1 |
| polyethylene oxide*** | Polysciences | 0.05 |
| urea | Aldrich Chemical Co. | 6 |
| N,N-bis(2-hydroxyethyl-2-amino-ethanesulfonic acid) | Aldrich Chemical Co. | 0.6 |
| sodium hydroxide (20% by weight in water) | Aldrich Chemical Co. | 0.62 |

*solution containing 7.5% by weight dye solids in water
**95% by weight sulfolane, 5% by weight water
***bisphenol-A derivative, molecular weight 18,500, of the formula

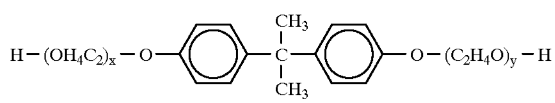

The resulting ink composition exhibited a viscosity of 3.61 centipoise at 25° C., a surface tension of 38.6 dynes per centimeter, a pH of 8.74 at 25° C., and a conductivity of 5.20 millimhos.

EXAMPLE III

An ink composition was prepared by simple mixing of the following ingredients:

| Ingredient | Supplier | Amount (wt. %) |
|---|---|---|
| PROJET YELLOW OAM dye (Acid Yellow 23)* | Zeneca Colors | 53.85 |
| sulfolane** | Phillips 66 | 21 |
| tripropylene glycol monomethyl ether (DOWANOL TPM) | Dow Chemical Co. | 18 |
| DOWICIL 150/200 biocide | Dow Chemical Co. | 0.1 |
| polyethylene oxide*** | Polysciences | 0.05 |
| tris(hydroxymethylamino) methane | American Biorganics | 0.65 |
| ethylene diamine tetraacetic acid | Dow Chemical Co. | 0.35 |
| urea | Aldrich Chemical Co. | 6 |

*solution containing 7.5% by weight dye solids in water
**95% by weight sulfolane, 5% by weight water
***bisphenol-A derivative, molecular weight 18,500, of the formula

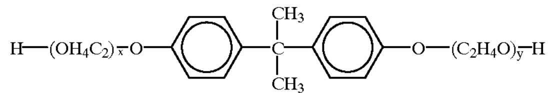

The resulting ink composition exhibited a viscosity of 3.72 centipoise at 25° C., a surface tension of 39.6 dynes per centimeter, a pH of 8.20 at 25° C., and a conductivity of 4.98 millimhos.

EXAMPLE IV

An ink composition was prepared by simple mixing of the following ingredients:

| Ingredient | Supplier | Amount (wt. %) |
|---|---|---|
| PROJET YELLOW OAM dye (Acid Yellow 23)* | Zeneca Colors | 53.85 |
| sulfolane** | Phillips 66 | 25 |
| tripropylene glycol monomethyl ether (DOWANOL TPM) | Dow Chemical Co. | 9 |
| DOWICIL 150/200 biocide | Dow Chemical Co. | 0.1 |
| polyethylene oxide*** | Polysciences | 0.05 |
| tris (hydroxymethylamino) methane | American Biorganics | 0.65 |
| ethylene diamine tetraacetic acid | Dow Chemical Co. | 0.35 |
| urea | Aldrich Chemical Co. | 10 |
| deionized water | — | 1 |

*solution containing 7.5% by weight dye solids in water
**95% by weight sulfolane, 5% by weight water
***bisphenol-A derivative, molecular weight 18,500, of the formula -continued

| Ingredient | Supplier | Amount (wt. %) |
|---|---|---|

$$H-(OH_4C_2)_x-O-C_6H_4-C(CH_3)_2-C_6H_4-O-(C_2H_4O)_y-H$$

The resulting ink composition exhibited a viscosity of 2.75 centipoise at 25° C., a surface tension of 44.2 dynes per centimeter, a pH of 8.25 at 25° C., and a conductivity of 6.28 millimhos.

EXAMPLE V

Comparative

An ink composition was prepared by simple mixing of the following ingredients:

| Ingredient | Supplier | Amount (wt. %) |
|---|---|---|
| PROJET YELLOW OAM dye (Acid Yellow 23)* | Zeneca Colors | 59.78 |
| sulfolane** | Phillips 66 | 15 |
| acetylethanolamine | Scher Chemical | 12 |
| butyl carbitol | Van Waters & Rogers | 12 |
| DOWICIL 150/200 biocide | Dow Chemical Co. | 0.1 |
| polyethylene oxide*** | Polysciences | 0.05 |
| imidazole | American Biorganics | 1 |
| ethylene diamine tetraacetic acid | Dow Chemical Co. | 0.06 |

*solution containing 7.5% by weight dye solids in wafer
**95% by weight sulfolane, 5% by weight wafer
***bisphenol-A derivative, molecular weight 18,500, of the formula

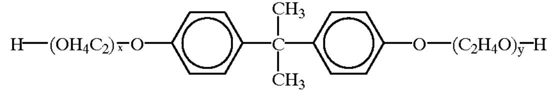

The resulting ink composition exhibited a viscosity of 3.34 centipoise at 25° C., a surface tension of 36.2 dynes per centimeter, a pH of 8.29 at 25° C., and a conductivity of 6.21 millimhos.

EXAMPLE VI

An ink composition was prepared by simple mixing of the following ingredients:

| Ingredient | Supplier | Amount (wt. %) |
|---|---|---|
| PROJET YELLOW OAM dye (Acid Yellow 23)* | Zeneca Colors | 53.78 |
| sulfolane** | Phillips 66 | 5 |
| acetylethanolamine | Scher Chemical | 2 |
| butyl carbitol | Van Waters & Rogers | 2 |
| DOWICIL 150/200 biocide | Dow Chemical Co. | 0.1 |
| polyethylene oxide*** | Polysciences | 0.05 |
| imidazole | American Biorganics | 1 |
| ethylene diamine tetraacetic acid | Dow Chemical Co. | 0.06 |
| urea | Aldrich Chemical Co. | 6 |

*solution containing 7.5% by weight dye solids in water
**95% by weight sulfolane, 5% by weight water
***bisphenol-A derivative, molecular weight 18,500, of the formula -continued

| Ingredient | Supplier | Amount (wt. %) |
| --- | --- | --- |

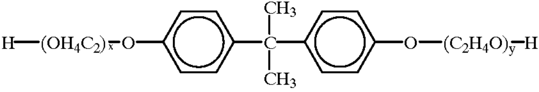

The resulting ink composition exhibited a viscosity of 3.70 centipoise at 25° C., a surface tension of 36.9 dynes per centimeter, a pH of 8.51 at 25° C., and a conductivity of 5.39 millimhos.

EXAMPLE VII

An ink composition was prepared by simple mixing of the following ingredients:

| Ingredient | Suppler | Amount (wt. %) |
| --- | --- | --- |
| PROJET YELLOW OAM dye (Acid Yellow 23)* | Zeneca Colors | 53.33 |
| sulfolane** | Phillips 66 | 14 |
| acetylethanolamine | Scher Chemical | 10.45 |
| butyl carbitol | Van Waters & Rogers | 11 |
| DOWICIL 150/200 biocide | Dow Chemical Co. | 0.1 |
| polyethylene oxide*** | Polysciences | 0.05 |
| imidazole | American Biorganics | 1 |
| ethylene diamine tetraacetic acid | Dow Chemical Co. | 0.06 |
| urea | Aldrich Chemical Co. | 10 |

*solution containing 7.5% by weight dye solids in water
**95% by weight sulfolane, 5% by weight water
***bisphenol-A derivative, molecular weight 18,500, of the formula

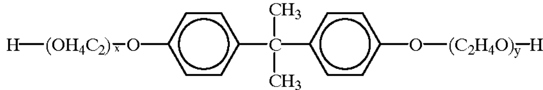

The resulting ink composition exhibited a viscosity of 3.55 centipoise at 25° C., a surface tension of 36.9 dynes per centimeter, a pH of 8.49 at 25° C., and a conductivity of 4.89 millimhos.

EXAMPLE VIII

The inks prepared in Examples I through VII were evaluated as follows:

The inks were coated onto glass slides and allowed to dry. The inks of Examples I and V exhibited rapid crusting on the slide within minutes, forming an orange, powdery crust on the slide. The inks of Examples II, III, VI, and VII dried over a period of hours, after which a clear yellow film was present on the slide with small areas of orange crust. The slides were rated on a visual scale of 1 to 5, with 1 representing orange powdery crust and 5 representing a clear yellow film. The slides with the inks of Examples I and V were rated 1 on this scale, the slides with the inks of Examples II and III were rated 3 on this scale, the slide with the ink of Example IV was rated 4 on this scale, and the slides with the inks of Examples VI and VII were rated 4.5 on this scale. As these results indicate, the inks containing 6% urea demonstrated a crusting time and behavior advantage over ink compositions containing no urea. This advantage was observed for both the ink with the N,N-bis(2-hydroxyethyl-2-aminoethane sulfonic acid/sodium hydroxide buffer system (ink of Example II) and the ink with the tris(hydroxymethylamino)methane/EDTA buffer system (ink of Example III), and was observed both for inks having the sulfolane/tripropylene glycol monomethyl ether solvent system (inks of Examples I through IV) and for inks having the sulfolane/butyl carbitol/acetylethanolamine solvent system (inks of Examples V through VII).

The inks were incorporated into a Xerox® XJ4C color thermal ink jet printer and used to jet images onto Xerox® Image Series LX paper under ambient lab conditions. The ink of Example II containing 6% urea exhibited an order of magnitude increase in recoverability with respect to the ink of Example I and also exhibited excellent functional latency (>30 seconds) while maintaining a high level of print quality in terms of optical density, MFLEN, and color gamut. The ink of Example IV containing 10% urea showed significant advantages over the inks of Examples I through III, particularly in terms of missing drops and 9th drop latency. For the inks of Examples II and III, 9th drop latency was 30 to 100 seconds in a first test cartridge and 30 to 500 seconds in a second test cartridge; for the ink of Example IV, 9th drop latency was over 2,000 seconds in both the first test cartridge and the second test cartridge.

The inks of Examples V, VI, and VII were frozen and subsequently thawed. The ink of Example V exhibited precipitation of the dye from the ink after a single freeze/thaw cycle, whereas the inks of Examples VI and VII exhibited no precipitation of the dye from the ink.

EXAMPLE IX

Ink compositions were prepared by simple mixing of the following ingredients (obtained from the suppliers indicated above; amounts indicated are percent by weight of the ingredient in the ink composition) which exhibited the indicated characteristics:

| | A | B | C | D | E | F |
| --- | --- | --- | --- | --- | --- | --- |
| sulfolane* | 11 | 25 | 18 | 25 | 11 | 25 |
| tripropylene glycol monomethyl ether | 9 | 9 | 15.4 | 9 | 22 | 9 |
| urea | 0 | 10 | 5 | 10 | 10 | 0 |
| deionized water | 25 | 1 | 6.6 | 1 | 2 | 11 |
| Acid Yellow 23** | 53.85 | 53.85 | 53.85 | 53.85 | 53.85 | 53.85 |
| DOWICIL 150/200 | 0.1 | 0.1 | 0.1 | 0.1 | 0.1 | 0.1 |
| polyethylene oxide*** | 0.05 | 0.05 | 0.05 | 0.05 | 0.05 | 0.05 |
| tris(hydroxymethylamino) methane | 0.65 | 0.65 | 0.65 | 0.65 | 0.65 | 0.65 |
| EDTA | 0.35 | 0.35 | 0.35 | 0.35 | 0.35 | 0.35 |
| viscosity @ 25° C. (centipoise) | 1.89 | 2.75 | 3.01 | 2.69 | 3.98 | 2.38 |
| surface tension (dyne/cm) | 44.8 | 44.2 | 41.1 | 44.5 | 36.4 | 44.7 |
| pH @ 25° C. | 8.10 | 8.25 | 8.12 | 8.27 | 8.18 | 8.08 |
| conductivity (millimhos) | 8.46 | 6.28 | 5.95 | 6.42 | 4.14 | 7.39 |

| | G | H | J | K | L |
| --- | --- | --- | --- | --- | --- |
| sulfolane* | 25 | 11 | 21 | 11 | 11 |
| tripropylene glycol monomethyl ether | 20 | 22 | 18 | 22 | 9 |
| urea | 0 | 10 | 6 | 0 | 19 |
| deionized water | 0 | 2 | 0 | 12 | 15 |
| Acid Yellow 23** | 53.85 | 53.85 | 53.85 | 53.85 | 53.85 |
| DOWICIL 150/200 | 0.1 | 0.1 | 0.1 | 0.1 | 0.1 |
| polyethylene oxide*** | 0.05 | 0.05 | 0.05 | 0.05 | 0.05 |
| tris(hydroxymethylamino) methane | 0.65 | 0.65 | 0.65 | 0.65 | 0.65 |
| EDTA | 0.35 | 0.35 | 0.35 | 0.35 | 0.35 |
| viscosity @25° C. (centipoise) | 3.85 | 3.91 | 3.63 | 3.38 | 2.16 |
| surface tension (dyne/cm) | 35.6 | 37.4 | 38.0 | 35.6 | 45.4 |
| pH @ 25° C. | 8.09 | 8.24 | 8.21 | 8.06 | 8.26 |

-continued

| | | | | | |
|---|---|---|---|---|---|
| conductivity (millimhos) | 4.49 | 4.58 | 4.90 | 4.81 | 7.25 |

*95% by weight sulfolane, 5% by weight water
**solution containing 7.5% by weight dye solids in water
***bisphenol-A derivative, molecular weight 18,500, of the formula

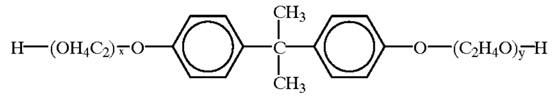

The inks thus prepared were measured for particle count at room temperature immediately after preparation ("Particle Count 1"), and measured again for particle count subsequent to being maintained at 60° C. for 24 hours and subsequently cooled to room temperature ("Particle Count 2"). Particle counts were measured on a HIAC/ROYCO particle counting system consisting of a Model 8000A controller, a Model ABS-2 sampling stand, and a Model HRLD-400HC sensor. The measurement principle was that a measured quantity of ink was allowed to flow past the sensor system, which consisted of a laser light source shining through the flowing liquid to a sensor on the opposite wall. When a sufficiently large particle flowed by (in this instance, greater than about 2 microns in average particle diameter), the light sensor detected an electrical signal from blockage of the light source. (Increasing particle count can be a measure of ink instability, but can also be the result of random contamination.) The inks were also coated onto glass slides and evaluated for crusting. Specifically, the inks were coated onto slides and allowed to dry for 1 day at room temperature, followed by a visual determination of whether a precipitate had formed on the slide ("slide ppt"). The slides were also rated on a visual scale of 1 to 5 for "slide crust", with 1 representing orange powdery crust and 5 representing a clear yellow film.

The inks were incorporated into a Xerox® XJ4C color thermal ink jet printer and used to jet images under ambient lab conditions. Optical density of a solid patch printed in normal mode onto Xerox® Image Series LX paper ("OD-LX") was measured, as was the average optical density of prints made on Xerox® Image Series LX paper, Hammermill Tidal DP paper, and Xerox 4024 DP paper obtained from the Champion Cortland mill ("OD 3 papers"). Optical density was measured with an X-Rite densitometer. Edge acuity on the LX paper (MFLEN-LX) and intercolor bleed between the yellow inks and the cyan and magenta inks normally supplied for the Xerox® XJ4C printer were also measured. Results were as follows:

| Ink | slide ppt | slide crust | Particle count 1 | Particle count 2 | OD-LX | OD 3 papers | MFLEN-LX | ICB vs. mag. | ICB vs. cyan |
|---|---|---|---|---|---|---|---|---|---|
| A | yes | 1 | 24 | 130 | 1.063 | 1.093 | 17.40 | 21.30 | 16.55 |
| B | no | 4 | 77 | 188 | 1.058 | 1.059 | 19.20 | 20.85 | 18.45 |
| C | yes | 3 | 405 | 1810 | 1.034 | 1.035 | 19.95 | 25.40 | 23.55 |
| D | no | 4 | 85 | 162 | 1.069 | 1.083 | 21.70 | 21.45 | 27.35 |
| E | no | 3.5 | 1912 | 3288 | 1.007 | 1.012 | 17.05 | 22.30 | 20.10 |
| F | yes | 1 | 41 | 103 | 1.045 | 1.058 | 19.75 | 22.55 | 19.30 |
| G | yes | 1 | 2301 | 539 | 0.947 | 0.962 | 19.10 | 27.25 | 21.70 |
| H | no | 3.5 | 1440 | 2448 | 0.971 | 0.992 | 22.05 | 21.23 | 22.15 |
| J | yes | 3 | 1369 | 3511 | 0.998 | 1.022 | 17.15 | 25.05 | 23.15 |
| K | yes | 1 | 595 | 18603 | 0.993 | 1.000 | 18.15 | 24.25 | 21.70 |
| L | no | 3.5 | 200 | 63 | 1.084 | 1.106 | 18.00 | 22.60 | 19.35 |

After 16 hours (at which time some of the slides may not have dried completely), each of the slides with an ink containing 10% urea remained a clear yellow film, and any crusting behavior (which dropped the crusting rating below 5) was apparent only at extended time or with applied heat. At least some visible crusting was observed after 16 hours at room temperature for the inks containing less than 10% urea.

Jetting performance of the inks prepared in Examples I, II, III, and IV was evaluated for first drop and ninth drop latency in two different printheads. "Latency 80" was a measurement taken in which only those drops which arrived within 80 microseconds or less were considered, and "Latency 100" was a measurement taken in which only those drops which arrived within 100 microseconds or less were considered. The results, reported in seconds, were as follows:

| Ink | Printhead 1 Latency 80 (1st, 9th) | Printhead 1 Latency 100 (1st, 9th) | Printhead 2 Latency 80 (1st, 9th) | Printhead 2 Latency 100 (1st, 9th) |
|---|---|---|---|---|
| I | 5, 5 | — | — | — |
| II | 5, 30 | 10, 40 | 5, 500 | 30, 500 |
| III | 2, 100 | 2, 100 | 10, 30 | 10, 30 |
| IV | 5, 2000+ | 10, 2000+ | 40, 2000+ | 2000, 2000+ |

— = not measured

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises (a) water; (b) Acid Yellow 23 dye; and (c) urea; wherein the dye is present in the ink in an amount of at least about 3 percent by weight of the ink.

2. An ink composition according to claim 1 wherein the urea is present in the ink in an amount of from about 5 to about 15 percent by weight of the ink.

3. An ink composition according to claim 1 wherein the urea is present in the ink in an amount of from about 5 to about 10 percent by weight of the ink.

4. An ink composition according to claim 1 wherein the dye is present in the ink in an amount of from about 3 to about 6 percent by weight of the ink.

5. An ink composition according to claim 1 further containing sulfolane.

6. An ink composition according to claim 1 further containing tripropylene glycol monomethyl ether.

7. An ink composition according to claim 1 further containing butyl carbitol.

8. An ink composition according to claim 1 further containing acetylethanolamine.

9. An ink composition according to claim 1 further containing sulfolane and tripropylene glycol monomethyl ether.

10. An ink composition according to claim 9 wherein the sulfolane is present in the ink in an amount of from about 10 to about 30 percent by weight of the ink and the tripropylene glycol monomethyl ether is present in the ink in an amount of from about 8 to about 25 percent by weight of the ink.

11. An ink composition according to claim 1 further containing sulfolane, butyl carbitol, and acetylethanolamine.

12. An ink composition according to claim 11 wherein the sulfolane is present in the ink in an amount of from about 5 to about 30 percent by weight of the ink, the butyl carbitol is present in the ink in an amount of from about 3 to about 15 percent by weight of the ink, and the acetylethanolamine is present in the ink in an amount of from about 2 to about 25 percent by weight of the ink.

13. An ink composition according to claim 1 wherein the dye is present in the ink in an amount of at least about 4 percent by weight of the ink.

14. An ink composition prepared by admixing (a) water; (b) Acid Yellow 23 dye; and (c) urea; wherein the dye is present in the ink in an amount of at least about 3 percent by weight of the ink.

15. A process which comprises (i) incorporating into an ink jet printing apparatus an ink composition according to claim 1; and (ii) causing droplets of the ink composition to be ejected in an imagewise pattern onto a substrate.

16. A process according to claim 15 wherein the printing apparatus employs a thermal ink jet process wherein the ink in the nozzles is selectively heated in an imagewise pattern, thereby causing droplets of the ink to be ejected in imagewise pattern.

17. A process according to claim 15 wherein the urea is present in the ink in an amount of from about 5 to about 15 percent by weight of the ink.

18. A process according to claim 15 wherein the urea is present in the ink in an amount of from about 5 to about 10 percent by weight of the ink.

19. A process according to claim 15 wherein the dye is present in the ink in an amount of from about 3 to about 6 percent by weight of the ink.

20. An ink composition according to claim 14 wherein the dye is present in the ink in an amount of at least about 4 percent by weight of the ink.

21. An ink composition consisting essentially of (a) water; (b) Acid Yellow 23 dye; (c) one or more water soluble or water miscible organic solvents; (d) urea; (e) one or more optional biocides; (f) one or more optional pH controlling agents; and (g) an optional polymeric additive comprising two polyalkylene oxide chains bound to a central bisphenol-A-type moiety.

22. An ink composition according to claim 21 wherein the organic solvent is selected from the group consisting of sulfolane, tripropylene glycol monomethyl ether, butyl carbitol, acetylethanolamine, and mixtures thereof.

* * * * *